US006734361B2

(12) United States Patent
Mesaki et al.

(10) Patent No.: US 6,734,361 B2
(45) Date of Patent: May 11, 2004

(54) INSULATED WIRE

(75) Inventors: Masakazu Mesaki, Tokyo (JP); Yoshinori Tatematsu, Tokyo (JP)

(73) Assignee: The Furukawa Electric Co., Ltd., Toyko (JP)

( * ) Notice: Subject to any disclaimer, the term of this patent is extended or adjusted under 35 U.S.C. 154(b) by 0 days.

(21) Appl. No.: 09/958,615

(22) PCT Filed: Feb. 13, 2001

(86) PCT No.: PCT/JP01/00975

§ 371 (c)(1),
(2), (4) Date: Feb. 12, 2002

(87) PCT Pub. No.: WO01/59791

PCT Pub. Date: Aug. 16, 2001

(65) Prior Publication Data

US 2003/0098176 A1 May 29, 2003

(30) Foreign Application Priority Data

Feb. 10, 2000 (JP) .......... 2000-33939
Mar. 1, 2000 (JP) .......... 2000-56333

(51) Int. Cl.⁷ .............. H01B 3/00
(52) U.S. Cl. .............. 174/110 R; 174/110 N
(58) Field of Search .......... 174/110 R, 120 R, 174/110 N, 110 SR; 428/375, 379, 383

(56) References Cited

U.S. PATENT DOCUMENTS

| 4,378,407 | A | | 3/1983 | Yamamoto et al. .......... 428/383 |
| 5,272,222 | A | | 12/1993 | Okinoshima et al. ....... 525/431 |
| 5,608,868 | A | * | 3/1997 | Simon .......... 528/27 |
| 5,861,578 | A | * | 1/1999 | Hake et al. .......... 174/120 R |
| 5,965,263 | A | * | 10/1999 | Tatematsu et al. .......... 428/383 |

FOREIGN PATENT DOCUMENTS

| CH | 498 173 | 12/1970 |
| GB | 2163763 | 3/1986 |
| JP | 63-027528 | 2/1988 |
| JP | 03-037283 | 2/1991 |
| JP | 05-101713 | 4/1993 |
| JP | 06-111632 | 4/1994 |
| JP | 06-196025 | 7/1994 |
| JP | 07-094025 | 4/1995 |
| JP | 07-105745 | 4/1995 |
| JP | 07-335034 | 12/1995 |
| JP | 2000-260233 | 9/2000 |
| WO | WO 98/32138 | 7/1998 |
| WO | WO 01/05862 A1 | 1/2001 |
| WO | WO 01/05862 * | 1/2001 |

OTHER PUBLICATIONS

Concise explanation of documents for references 1 through 6 and 11.

* cited by examiner

*Primary Examiner*—Chau N. Nguyen
(74) *Attorney, Agent, or Firm*—Knobbe, Martens, Olson & Bear LLP

(57) ABSTRACT

An insulated wire having a silane-modified polyamideimide resin, obtainable by reacting an alkoxy- or aryloxy-silane partial condensate containing a glycidyl ether group, with a polyamideimide resin having a carboxyl group and/or an acid anhydride group at an end thereof, that is coated and baked on a conductor directly or through another insulating layer.

9 Claims, No Drawings

INSULATED WIRE

TECHNICAL FIELD

The present invention relates to an insulated wire preferable to be used in a coil for, for example, a motor and a transformer, which insulated wire has good insulating property and excellent resistance to working.

BACKGROUND ART

Insulated wires coated with an electrical insulator are used in a large amount in many applications as coils incorporated into a variety of electric machinery and tools. Many insulated wires are used especially in electric machinery and tools, represented by motors and transformers. In recent years, progress has been made in both miniaturization and the level of performance characteristics of these machinery and tools, and now such insulated wires are often used by bundling them into a very narrow space. Specifically, it is no exaggeration to say that the performance of a rotator, such as a motor, is determined by how many wires are held in a cross section of a stator slot. As a result of this, the ratio (space factor) of the total sectional area of each conductor (the total sectional area of conductor in each wire) to the sectional area of the stator slot has been highly increased in recent years.

When insulated wires whose cross section has a round shape are closely packed inside of a stator slot, voids forming dead space, or the large sectional area of an insulating film, may be a barrier to increase the space factor. For avoiding this, when insulated wires are subjected to coil-winding, in order to improve the space factor as much as possible, the wires are pushed into the stator slot to such an extent that the wires having a cross section of a round shape are deformed. However, as expected, remarkable reduction in the sectional area of the insulating film has not been made, because it may sacrifice electrical performance (e.g. dielectric breakdown property).

In view of the above, as means for improving the space factor, an attempt has been made, very recently, to use an insulated wire of a rectangular wire with a conductor having a sectional shape similar toga quadrangle (a regular square or a rectangle). Use of the rectangular wire brings about a dramatic improvement in the space factor. However, it is difficult to apply an insulating film uniformly on a rectangular conductor, and it is particularly difficult to control the thickness of the insulating film in the case of insulated wire having a small sectional area. Therefore, the rectangular wire has not been widely used so much.

With regard to rectangular windings, there are several proposals concerning the method of manufacturing the windings and insulating materials of the windings. For example, a method of adhering a polyesterimide film uniformly onto a rectangular conductor is described in JP-A-2000-260233 ("JP-A" means unexamined published Japanese patent application), proposing an approach from the material side.

As to conventional insulated wires using a round conductor, many attempts are being made to improve the insulating performance of the film. For example, the use of resins, such as polytetrafluoroethylene, having a low dielectric constant, as the insulating film, is already known. However, these resins having a low dielectric constant have not been used in the field of enameled wires, because these resins having a low dielectric constant are thermoplastic, and also it is difficult to form such a thin film, as in the case of enameled wires.

Similarly, a method in which fine particles of metal oxides (e.g. titanium oxide and silica) are added in a varnish, to form an insulating film, is conventionally adopted. As a result, although an improvement in dielectric breakdown voltage is not observed, the occurrence of a corona in a high frequency region (for example, 1 kHz or more) is reduced, as is known. It is estimated that the reason dielectric breakdown voltage is not improved, though the occurrence of a corona is suppressed, is that, when the fine particle of the metal oxide is added to the varnish, air components, such as oxygen, are caught in the surface of the fine particle of the metal oxide, and the involved parts of the surface are converted into dielectrics, and therefore no improvement in dielectric breakdown voltage is observed.

The characteristics of the insulating film that are required when the coiling of a motor or transformer is conducted, include resistance to working of the insulating film. This is because, in the aforementioned coiling, the electrical insulating property is reduced if the wire film is damaged.

Various methods are proposed to provide the wire film with resistance to working. For example, these methods include one in which lubricity is imparted to an insulating film, to lower the friction coefficient, thereby decreasing external damage during coiling, and a method in which adhesion between an insulating film and an electric conductor is improved, to prevent the film from peeling from the conductor, thereby maintaining the electrical insulating property that the insulating film originally has.

As the former method of imparting lubricating ability, a method in which the surface of a wire is coated with a lubricant, such as wax, or a method in which a lubricant is added in an insulating film and then is allowed to breed out on the wire surface when a wire is produced, thereby imparting lubricating ability, is conventionally adopted and practically used in many examples. However, this method of providing lubricating ability does not improve the mechanical strength of the wire film itself, in any sense. Therefore, this method appears to have an effect on factors of external damage; however, there is a limitation on these effects, in actuality.

Various methods have been hitherto proposed concerning improving the adhesion between the conductor and the insulating film. As specific examples of an insulating coating to be used for this purpose, 1) a heat-resistant coating, composed of a polyamideimide resin, an alkoxy-modified amino resin, and benzotriazole (JP-A-3-37283), and 2) a coating composed of a polyamideimide resin and trialkylamine (JP-A-6-111632), are proposed. Wires produced by these measures are found to have an effect to pass the reciprocating abrasion test (test in which a relatively low load is applied to the wire to be tested and the film is rubbed by a bead-needle). However, in the one-way abrasion test (the test prescribed in JIS C 3003; the film is scratched by a piano wire while applying a load gradually to the wire), a satisfactory effect is not observed. In recent years, the latter test method is regarded as important in testing for film damage. Further, many wires produced using only means of improving adhesion are decreased in the reciprocating abrasion value with a decrease in the thickness of the film, and the adhesion of these wires is eventually decreased to the same level as that of the conventional wire in which no means of improving adhesion is utilized.

On the other hand, a method is proposed in which many rigid structures are introduced into a molecule, in light of the molecular structure of the resin, to improve the film strength, thereby decreasing working damage to the film. JP-A-6-

196025 describes such an insulated wire having an insulating film having a prescribed tensile strength and tensile elasticity modulus. Such an insulated wire is found to have an outstanding effect in the one-way abrasion test, and it ensures that damage to the film when coiling can be prevented, even if the film is decreased in thickness. However, such an insulated wire is more reduced in the level of flexibility after it is elongated or is subjected to thermal history, compared with the conventional wire, and it might crack and break down in the film because of insufficient flexibility when it is subjected to bending under particularly severe conditions.

DISCLOSURE OF THE INVENTION

The inventors of the present invention have found, as a result of studying the reasons to cause dielectric breakdown in an insulating film of conventional insulated wires, that a material that is resistant against dielectric breakdown, that is, an insulating film having a specific silane-modified polyamideimide resin coated and baked thereon, as an insulating film material that has a low solid dielectric constant and a high dielectric breakdown voltage, significantly contributes to improving the insulation property and resistance to working of an insulated wire having such an insulating film. The present invention has been completed based on this discovery.

The present invention is an insulated wire that comprises a silane-modified polyamideimide resin, obtainable by reacting an alkoxy- or aryloxy-silane partial condensate containing a glycidyl ether group, with a polyamideimide resin having a carboxyl group and/or an acid anhydride group at an end thereof, that is coated and baked on a conductor directly or through another insulating layer.

Further, the present invention is an insulated wire that comprises a silane-modified polyamideimide resin having a silicon content of 1 to 15 mass %, that is coated and baked on a conductor directly or through another insulating layer.

BEST MODE FOR CARRYING OUT THE INVENTION

The present invention will be hereinafter explained in detail.

In the present invention, there is no particular limitation on a polyamideimide resin to be used as a base resin of the silane-modified polyamideimide resin that is utilized to form the insulating film, if the polyamideimide resin has a carboxyl group and/or an acid anhydride group at an end thereof. As the polyamideimide resin, use can be made, for example, of a resin obtained by directly reacting a tricarboxylic acid anhydride with a diisocyanate in a polar solvent, or a resin obtained by reacting a tricarboxylic acid anhydride with a diamine in a polar solvent to introduce an imide bond first and then by amidating the resulting product by using a diisocyanate, in a usual manner.

As the tricarboxylic acid anhydride that can be used for preparing this polyamideimide resin, generally, a trimellitic acid anhydride is preferably used. In this case, a part of the amount of tricarboxylic acid anhydride may be replaced by a tetracarboxylic acid anhydride when it is reacted. As the tetracarboxylic acid anhydride in this case, use can be made, for example, of pyromellitic acid dianhydride, 3,3',4,4'-benzophenonetetracarboxylic to acid dianhydride, or the like. Further, a part of the amount of tricarboxylic acid anhydride may be replaced by another acid or acid anhydride, for example, trimellitic acid, isophthalic acid or terephthalic acid. On the other hand, the examples of the diisocyanate that can be reacted with the tricarboxylic acid anhydride, include aromatic diisocyanates such as 4,4'-diphenylmethane diisocyanate and tolylene diisocyanate, and the examples of the diamine include aromatic diamines such as m-phenylenediamine, 4,4'-diaminodiphenyl ether, 4,4'-diaminodiphenylmethane, 4,4'-diaminodiphenylsulfon and 4,4'-diaminobenzophenone. Further, for the imidation, N,N'-dimethylformamide may be used. Further, examples of the polar solvent include N-methyl-2-pyrrolidone, N,N'-dimethylformamide, dimethylacetoamide, and the like. Among them, N-methyl-2-pyrrolidone can be preferably used.

To the thus-obtained polyamideimide resin (a base resin) solution, is added an alkoxy- or aryloxy-silane partial condensate containing a glycidyl ether, group, which is a product of dealcoholization reaction of glycidol with an alkoxy- or aryloxy-silane partial condensate, and the polyamideimide resin is reacted with the alkoxy- or aryloxy-silane partial condensate containing a glycidyl ether group, thereby a silane-modified polyamideimide resin can be obtained. As a typical example of a method of preparing the silane-modified polyamideimide resin, the method described below can be mentioned.

Any commonly known alkoxy- or aryloxysilane partial condensate (condensation product) may be employed in the present invention. The alkoxy- or aryloxysilane partial condensate for use in the present invention may be, for example, a linear condensate (e.g. methoxyorganosiloxane), produced as a result of condensation by dealkyletherization reaction of at least two molecules of alkoxy- or aryloxysilane compounds. Herein, the alkoxy- or aryoxysilane compounds to be condensed may be the same or different from each other. The alkoxy group of the alkoxysilane partial condensate is preferably an alkoxy group having 1 to 6 carbon atoms, and more preferably an alkoxy group having 1 to 4 carbon atoms. Preferable examples thereof include methoxy, ethoxy, propoxy, butyloxy, and the like. The aryloxy group is preferably an aryloxy group having 6 to 10 carbon atoms, and more preferably an aryloxy group having 6 to 8 carbon atoms. Preferable examples thereof include phenyloxy, dimethylphenyloxy, methylphenyloxy, and the like. The aforementioned alkoxy group and aryloxy group may further have a substituent thereon. Specific examples thereof include condensates, such as methoxypolyorganosiloxane, ethoxypolyorganosiloxane, and phenyloxypolyorganosiloxane. In addition to the above, copolymers of phenyloxyorganosiloxane and methoxyorganosiloxane or the like may be used. Typical examples of commercially-available products of the methoxyorganosiloxane that is a partial condensate of tetramethoxysilane include "M SILICATE 51" (trade name) manufactured by Tama Kagaku Kogyo.

The average number of the silicon (Si) in one molecule of the alkoxy- or aryloxysilane partial condensate is preferably 2 to 100. When the average number of the Si is less than 2, the amount of alkoxy- or aryloxysilane, which is not reacted but is distilled off from the system together with an alcohol that is used as a solvent, is increased too much, when it is reacted with glycidol, in some cases. If the average number of the Si is more than 100, reactivity with glycidol becomes poor and it is difficult to obtain the glycidyl ether group-containing alkoxy- or aryloxysilane partial condensate to be intended, in some cases. The average number of the Si per molecule is more preferably 3 to 20, taking the materials availability into consideration.

For example, the following method may be used for the dealcoholization reaction between each of these alkoxy- or aryloxysilane partial condensate and glycidol. To 1 mol of the tetramethoxysilane partial condensate (the average number of the Si per molecule: 4), is added 2 mol of glycidol, and the resultant mixture is heated to about 120° C. in a bulk condition, thereby the generation of an alcohol can be observed. The reaction is continued while this alcohol is distilled off from the system, thereby methoxytetraorganosiloxane diglycidyl ether that is the glycidyl ether group-containing alkoxy- or aryloxysilane partial condensate can be obtained. The glycidyl ether group-containing alkoxy- or aryloxysilane partial condensate produced in this reaction contains two grycidyl groups in one molecule. At this time, it is preferable to use an organic tin-series catalyst as a reaction catalyst, since the reaction proceeds more rapidly.

In order to react the resulting glycidyl ether group-containing alkoxy- or aryloxysilane partial condensate with the polyamideimide resin, for example, the following method can be utilized. 200 g of a solution obtained by dissolving 25% by mass of the polyamideimide resin in N-methyl-2-pyrrolidone and 5.17 g of methoxytetraorganosiloxane-diglycidyl ether prepared by the aforementioned method are heated to 95° C., while mixing the both in an appropriate heatable container. The resultant mixture was reacted at 95° C. for 4 hours, and then 5.17 g of N-methyl-2-pyrrolidone was added to the reaction mixture, followed by cooling, to obtain a silane-modified polyamideimide resin solution having 25% of a nonvolatile component. In this case, the content of silicon is 4.29% by mass.

The content of silicon in the silane-modified polyamideimide resin for use in the present invention is preferably in the range of 1 to 15 mass %. If the content of silicon is too small, the effect achieved by insulated wires having the silane-modified polyamideimide resin coated and baked thereon (the effect of improving scratch-resistance property of the wires, in particular) is hardly obtained, resulting in only the same performance as the conventional insulating film on the other hand, if the content of silicon is too large, the appearance of the resultant insulated wire after baking is not so good, and minute roughness occurred on the surface of the insulated wire, which may have an affection on the electric property of the wire. Thus, the content of silicon is to be determined appropriately, in consideration of the aforementioned facts.

This content of silicon is almost determined by the molar ratio adopted when the resin is synthesized. The content is determined more exactly by using the resonance spectrum of $^{29}$Si measured using a solid NMR. In this case, it is general to use polydimethylsiloxane (−34 ppm) as a standard sample.

The insulated wire of the present invention can be produced according to a method in which the silane-modified polyamideimide resin is coated onto a conductor as it is, followed by baking, or a method in which the silane-modified polyamideimide resin is coated onto a conductor through another insulating material, followed by baking. Further, for example, the silane-modified polyamideimide resin may also be used as an insulating material in an intermediate layer. In this case, it is preferable that a known polyamideimide resin is coated to provide at least one layer as an under layer, then the silane-modified polyamideimide resin is coated thereon to provide one layer, and further a polyamideimide resin is coated to provide an upper layer thereof.

When the silane-modified polyamideimide resin is coated on a conductor through another insulating material, there is no particular limitation on the another insulating material, and any one of insulating materials usually used in insulated wires may be used. As examples of the material, polyesters, heat-resistant modified polyesters, polyurethanes, polyesterimides, polyamideimides, polyimides, and the like can be exemplified.

Moreover, when the silane-modified polyamideimide resin is coated on a conductor, it is possible to make the resin itself possess self-lubricity. As a method for the self-lubricity, a known method may be used, for example, a method in which polyethylene wax is added in a resin solution is most usual.

In the present invention, there is no particular limitation on the thickness of the silane-modified polyamideimide resin layer, although the thickness thereof differs depending on, for example, whether the resin layer is solely formed directly on the conductor, or whether the resin layer is provided through another insulation layer. In general, the thickness of the silane-modified polyamideimide resin layer is preferably in the range of 0.001 to 0.040 mm, and more preferably in the range of 0.002 to 0.012 mm.

The baking after coating of the silane-modified polyamideimide resin may be carried out in a manner similar to that of the conventional coating-and-baking process. The baking temperature is generally in the range of 400 to 550° C., and preferably in the range of 480 to 530° C. Further, the coating-and-baking process of the silane-modified polyamideimide resin is preferably conducted as a process in which coating and baking are repeated a plurality of times, such that the resin is baked, after each coating, with a baking time of generally 15 seconds to 1 minute, preferably 20 to 25 seconds, and this coating-and-baking process is repeated generally at least 6 times, preferably 15 times or more. In such a process in which coating and baking are repeated a plurality of times, the total time of the coating and baking is generally 1 minute and 30 seconds to 15 minutes.

The silane-modified polyamideimide resin itself to be used in the present invention has been developed by Arakawa Kagaku Kogyo Co., and it is synthesized according to a method developed by the same company.

In the present invention, by coating and baking the silane-modified polyamideimide resin on a conductor, silica (SiO$_2$) portions formed by the alkoxysilyl group or aryloxysilyl group of the resin, i.e., a higher-order network structure of siloxane bonding, is formed in the resulting insulating film. It is assumed that, due to the silica portions described above, the thus-obtained insulating film has a low dielectric constant.

The insulated wire of the present invention has high resistance to working, and it hardly causes poor insulation, since the breakdown of the insulating film does not occur and cracks of the film are hardly occurred even if a high load is applied under the severe conditions for coil-winding. Further, the insulated wire of the present invention has a high dielectric breakdown voltage, and it has the excellent insulation characteristics that even if the thickness of the film is made thin, no dielectric breakdown takes place. Further, the insulating film for use in the insulated wire of the present invention exhibits a low dielectric constant, which is as low as that of a polyimide. According to the above, when the insulated wire of the present invention is used, for example, in a transformer or a motor, it can be used in the condition of a high space factor, and it hardly causes poor insulation under such a circumstance. Therefore, according to the insulated wire of the present invention, a highly reliable coil can be provided, thereby exhibiting such excellent effects to contribute to miniaturization, cost reduction and improvement in reliability of the entire machinery and tools in which the coil utilizing the insulated wire of the present invention is used.

EXAMPLE

The present invention will be hereinafter explained in more detail based on the following examples, but the invention is not limited to these.

(Preparation of a Polyamideimide Resin)

A four neck flask with a volume of 2 little was equipped with a stirrer, a cooling tube and a calcium chloride tube, and the flask was charged with 192 g (1 mol) of trimellitic acid anhydride, 250 g (1 mol) of 4,4'-diphenylmethane diisocyanate and 663 g of N-methyl-2-pyrrolidone. The resultant mixture was reacted for 2 hours at 80° C. and for 5 hours at an elevated temperature of 140° C. Thereafter, the reaction mixture was cooled to 50° C., and 163 g of N,N'-dimethylformamide was added to the reaction mixture. According to the above procedure, a polyamideimide resin solution having a resin concentration of 30% was obtained.

(Preparation of a Glycidyl Ether Group-Containing Alkoxysilane Partial Condensate (1))

A four-neck flask with a volume of 1 little was equipped with a stirrer, a cooling tube and a condenser tube, and the flask was charged with 148.16 g (2 mol) of glycidol and 474.10 g (1 mol in terms of an average molecular weight) of a tetramethoxysilane partial condensate (the average number of the Si: 4). The resultant mixture was heated to 90° C. with stirring under a nitrogen stream. After reached 90° C. by heating, 0.70 g of dibutyltin dilaurate was added thereto as a catalyst, and the resultant mixture was reacted as it was. Methanol generated as a byproduct in the reaction was removed using a distilling column. When the amount of distilled-off methanol reached 50 g, the reaction mixture was cooled to room temperature. The reaction time during this process was 4 hours at 90° C. After the reaction mixture was cooled to room temperature, methanol left unremoved was removed under reduced pressure, to find that the total distilled-off amount of methanol was 64.0 g. As a result, 558.26 g of a glycidyl ether group-containing alkoxysilane partial condensate (a) was obtained. The ratio of "the average number of the Si per one molecule of the product/ the average number of the oxysilane ring (the glycidyloxy group on Si) per one molecule of the product" of this condensate (a) was 2.

(Preparation of a Glycidyl Ether Group-Containing Alkoxysilane Partial Condensate (2))

In the same manner as in the above (1), a flask was charged with 74.08 g (1 mol) of glycidol and 369.07 g (⅓mol) of a tetramethoxysilane partial condensate (the average number of the Si: 10), and the resultant mixture was heated to 90° C. with stirring under a nitrogen stream. After reached 93° C. by heating, 0.70 g of dibutyltin dilaurate was added thereto, as a catalyst, and the resultant mixture was reacted as it was. Methanol generated as a byproduct in the reaction was removed using a distilling column. When the amount of distilled-off methanol reached 20 g, the reaction mixture was cooled to room temperature. The reaction time during this process was 6 hours at 90° C. After the reaction mixture was cooled to room temperature, methanol left unremoved was removed under reduced pressure, to find that the total distilled-off amount of methanol was 32.0 g. As a result, 411.15 g of a glycidyl ether group-containing alkoxysilane partial condensate (b) was obtained. The ratio of "the average number of the Si per one molecule of the product/the average number of the oxysilane ring per one molecule of the product" of this condensate (b) was 3.

TABLE 1

|  | Condensate (a) | Condensate (b) |
|---|---|---|
| Average number of the Si in the tetramethoxysilane partial condensate | 4 | 10 |
| Average number of the Si per one molecule of the product/average number of the oxysilane ring per one molecule of the product | 2 | 3 |

(Preparation of a Silane-Modified Polyamideimide Resin (1))

A four neck flask with a volume of 1 little was equipped with a stirrer and a cooling tube, and the flask was charged with 50 g of the polyamideimide resin solution prepared as in the paragraph of the Preparation of a polyamideimide resin. Thereto, was added 5.17 g of the glycidyl ether group-containing alkoxysilane partial condensate (a) prepared as in the Preparation of a glycidyl ether group-containing alkoxysilane partial condensate (1). The resultant mixture was stirred at 95° C. for 4 hours. Thus, a silane-modified polyamideimide resin (the content of silicon: 4.29%) (AI-1) was obtained.

(Preparation of a Silane-Modified Polyamideimide Resin (2))

A four neck flask with a volume of 1 little was equipped with a stirrer and a cooling tube, and the flask was charged with 500 g of the polyamideimide resin solution prepared as in the paragraph of the Preparation of a polyamideimide resin. Thereto, was added 2.58 g of the glycidyl ether group-containing alkoxysilane partial condensate (a) prepared as in the Preparation of a glycidyl ether group-containing alkoxysilane partial condensate (1). The resultant mixture was stirred at 95° C. for 4 hours. Thus, a silane-modified polyamideimide resin (the content of silicon: 2.15%) (AI-2) was obtained. The content values of silicon shown in Table 2 and Table 3 were obtained by calculation from the resin mole ratios of siloxane and polyamideimide at the time of charging these substances.

TABLE 2

|  | AI-1 | AI-2 |
|---|---|---|
| Polyamideimide resin solution (g) | 500 | 500 |
| Type of glycidyl ether group-containing alkoxysilane partial condensate | Condensate (a) | Condensate (a) |
| (ditto) Amount (g) | 5.17 | 2.58 |
| Degree ot silane modification of the polyamideimide resin (content of silicon: mass %) | 4.29 | 2.15 |

(Preparation of Silane-modified Polyamideimide Resins (3 to 6))

A four neck flask with a volume of 1 little was equipped with a stirrer and a cooling tube, and the flask was charged with 500 g of the polyamideimide resin solution prepared as in the paragraph of the Preparation of a polyamideimide resin. Thereto, was added the glycidyl ether group-containing alkoxysilane partial condensate (b) prepared as in the Preparation of a glycidyl ether group-containing alkoxysilane partial condensate (2). The resultant mixture was stirred at 95° C. for 4 hours. Thus, silane-modified polyamideimide resins (AI-3 to AI-6) were obtained.

TABLE 3

|  | AI-3 | AI-4 | AI-5 | AI-6 |
|---|---|---|---|---|
| Polyamideimide resin solution (g) | 500 | 500 | 500 | 500 |
| Type of glycidyl ether group-containing alkoxysilane partial condensate | Condensate (b) | Condensate (b) | Condensate (b) | Condensate (b) |
| (ditto) Amount (g) | 1.20 | 1.42 | 3.07 | 16.1 |
| Degree of silane modification of the polyamideimide resin (content of silicon: mass %) | 0.75 | 1.18 | 2.56 | 13.4 |

Examples 1 to 7

Comparative Example 1

Each of the silane-modified polyamideimide resins prepared in the above manner was coated onto a conductor, followed by baking, to obtain a desired insulated wire, respectively. The insulated wire was formed according to the following manner.

As the conductor of the insulated wire, a copper wire having a diameter of 1.0 mm was used. With regard to the baking of the resin, the resin was coated and baked plural times, using an air-heating circular-type baking furnace having a furnace length of 7 m and an atmospheric temperature of 500° C., to form an insulating film having a predetermined film thickness. As the insulating film, an insulating layer of a single layer was provided in each of Examples 1 to 5 and Comparative Example 1. On the other hand, two insulating layers composed of an upper layer and a lower layer were provided in each of Examples 6 and 7. The thickness of each of these upper and lower insulating layers is described as the ratio of thickness in the parenthesis following the film thickness in Table 5. The silane-modified polyamideimide resin coatings (AI-1 to AI-6) that were prepared in the above were used for forming insulating layers. Further, as the insulation coatings to be used for comparison, HI-406 and HI-406A (trade names) manufactured by Hitachi Chemical were respectively used, as polyamideimide resins.

Example 8

A flask equipped with an optional stirrer was charged with 27 g of xylene and 3 g of polyethylene wax (Polyethylene Wax 400P, trade name, manufactured by Mitsui Chemical), and the resultant mixture was stirred at 120° C. for one hour. After the resultant mixture solution became transparent and uniform, it was cooled rapidly with stirring, to prepare a polyethylene wax dispersion (30 g).

This polyethylene wax dispersion (30 g) was added to 500 g of the silane-modified polyamideimide resin (AI-3) that was prepared previously, and the resultant mixture was stirred sufficiently such that the polyethylene wax was dispersed in the polyamideimide resin, to produce self-lubricating varnish.

This self-lubricating varnish was used for forming an insulated wire in the same manner as in Example 6.

The damage resistance of the resulting insulated wires in the aforementioned Examples 1 to 8 and Comparative Example 1 were evaluated, according to the test methods as shown below.

(One-way abrasion test): The test described in Item 10 of JIS C3003 was carried out. The result is expressed with N unit. It is shown that the higher the value of the result is, the more difficult the peeling of the film is caused.

(Impact drop test): The insulated wire to be tested was fixed onto a V-groove on a metal plate, in which the V-groove provided on the metal plate surface was shallower than the diameter of the insulated wire. Using a knife-edge (a point angle of 55 degrees and a tip curvature r=0.5) that was arranged so as to form a right angle with the longitudinal direction of the insulated wire, an impact load of 100 g, 500 g or 1000 g as the total load was, respectively, dropped on the insulated wire, at an angle of 45 degrees with a horizontal plane for a distance of 370 mm as the dropped distance of the load (actual moving length of the load). Then, the state whether the insulating film of the wire was broken or not, was evaluated in a test on leakage current caused by damaged portions of the wire. The leakage current test was carried out according to the pin hole test method described in JIS C3003, except that the polarity of each of the positive and negative electrodes were inverted, using an ammeter for detection. Using the conductor as the positive electrode and the water side as the negative electrode, and a voltage of 12 V was applied between the electrodes, to read the value of leakage current from the ammeter. The value shows that the larger the value is, the more easily the film is damaged.

The resistance to external damages was judged from the results of both of the impact drop test and the one-way abrasion test.

The results are shown in Tables 4 and 5.

TABLE 4

|  | Example 1 | Example 2 | Example 3 | Example 4 | Example 5 |
|---|---|---|---|---|---|
| Insulating coating 1 (upper layer) | AI-1 | AI-2 | AI-4 | AI-5 | AI-6 |
| Ratio of the film |  |  |  |  |  |
| Insulating coating 2 (lower layer) | — | — | — | — | — |
| Ratio of the film |  |  |  |  |  |
| Surface treatment of the wire | Paraffin wax coating | | | | |
| Finish diameter (mm) | 1.072 | 1.072 | 1.072 | 1.072 | 1.072 |
| Film thickness (mm) (Upper layer/lower layer) ratio | 0.036 | 0.036 | 0.036 | 0.036 | 0.036 |

TABLE 4-continued

|  | Example 1 | Example 2 | Example 3 | Example 4 | Example 5 |
|---|---|---|---|---|---|
| One-way abrasion (N) | 26 | 26 | 27 | 27 | 27 |
| Impact drop test Leakage current |  |  |  |  |  |
| Load 100 g | 0.00 | 0.00 | 0.00 | 0.00 | 0.00 |
| Load 500 g | 0.00 | 0.00 | 0.00 | 0.00 | 0.00 |
| Load 1000 g | 0.11 | 0.08 | 0.03 | 0.03 | 0.03 |

TABLE 5

|  | Comparative example 1 | Example 6 | Example 7 | Example 8 |
|---|---|---|---|---|
| Insulating coating 1 (upper layer) Ratio of the film | HI-406*[1] | AI-2 (30%) | AI-2 (30%) | AI-3 Polyethylene wax (20%) |
| Insulating coating 2 (lower layer) Ratio of the film Surface treatment of the wire | — | HI-406 (70%) | HI-406A*[2] (70%) | HI-406A (80%) |
| Finish diameter (mm) | 1.072 | 1.072 | 1.072 | 1.072 |
| Film thickness (mm) (Upper layer/lower layer) ratio | 0.036 | 0.036 (30/70) | 0.036 (30/70) | 0.036 (20/80) |
| One-way abrasion (N) | 18 | 27 | 27 | 30 |
| Impact drop test Leakage current |  |  |  |  |
| Load 100 g | 0.05 | 0.00 | 0.00 | 0.00 |
| Load 500 g | 0.20 | 0.00 | 0.00 | 0.00 |
| Load 1000 g | 1.50 | 0.00 | 0.03 | 0.03 |

(Note)
*[1]HI-406: A polyamideimide resin coating, trade name, manufactured by Hitachi Chemical.
*[2]HI-406A: A polyamideimide resin coating, trade name, manufactured by Hitachi Chemical (improved in adhesion to a conductor).

In the impact drop test, each of the Examples according to the present invention showed very high film rupture strength.

Contrary to the above, in the case of the wire of Comparative Example 1, it may be estimated that since this wire did not have the silane-modified polyamideimide resin layer, which is defined in the present invention, the wire for comparison could not disperse the force when a high load was applied and damages progressed to the conductor at a stroke, with the result that the intended film rupture strength, which is one index on resistance to working, could not be obtained.

For the evaluation of the insulating property, the electrical insulating property of each of insulated wires obtained in the above Examples 1 to 5 and Comparative Example 1 was evaluated, according to the following test methods.

(Dielectric breakdown voltage): The test described in JIS C3003 was carried out. The results are shown with kV unit, showing that the higher the value is, the higher the dielectric breakdown voltage is. Further, the relationship between the dielectric breakdown voltage and the thickness of the formed insulating film is also shown, in terms of the ratio of the two factors (voltage to thickness).

(Dielectric constant): The dielectric constant of the formed insulating-film was measured. The dielectric constant was measured using an LCR meter in which measuring frequency was set to 1 kHz. Further, measuring temperature was set to room temperature (25° C.) and 100° C.

The results are shown in Table 6.

TABLE 6

|  | Example 1 | Example 2 | Example 3 | Example 4 | Example 5 | Comparative example 1 |
|---|---|---|---|---|---|---|
| Insulating coating | AI-1 | AI-2 | AI-4 | AI-5 | AI-6 | HI-406* |
| Surface treatment of the wire |  |  | Paraffin wax coating |  |  |  |
| Finish diameter (mm) | 1.072 | 1.072 | 1.072 | 1.072 | 1.072 | 1.072 |
| Film thickness ($\mu$m) | 36 | 36 | 36 | 36 | 36 | 36 |
| Dielectric breakdown voltage (kV) |  |  |  |  |  |  |
| <Minimum> | 13.7 | 13.5 | 12.8 | 13.0 | 13.7 | 11.3 |
| <Average> | 14.4 | 15.5 | 14.9 | 15.1 | 15.3 | 13.1 |
| Dielectric breakdown voltage/film thickness (V/$\mu$m) | 400 | 431 | 414 | 419 | 425 | 363 |
| Dielectric constant (room temperature: 25° C.) 1 MHZ | 3.6 | 3.5 | 3.6 | 3.5 | 3.4 | 4.2 |
| Dielectric constant (100° C.) 1 MHZ | 3.7 | 3.8 | 3.8 | 3.7 | 3.8 | 4.3 |

(Note) *1 HI-406: A polyamideimide resin coating, trade name manufactured by Hitachi Chemical.

Industrial Applicability

The insulated wire of the present invention is excellent in insulation property and resistance to working. In particular, the insulated wire of the present invention exhibits an excellent insulation property, which is comparable to or exceeds the insulation property of the conventional thick insulating film, even if the insulating film of the wire of the present invention is thin. Accordingly, the insulated wire of the present invention is preferable for use in a coil of, for example, a motor or a transformer.

Having described our invention as related to the present embodiments, it is our intention that the invention not be limited by any of the details of the description, unless otherwise specified, but rather be construed broadly within its spirit and scope as set out in the accompanying claims.

What is claimed is:

1. An insulated wire, comprising a silane-modified polyamideimide resin, obtainable by reacting an alkoxy- or aryloxy-silane partial condensate containing a glycidyl ether group, with a polyamideimide resin having a carboxyl group, an acid anhydride group, or both a carboxyl group and an acid anhydride group at an end thereof, that is coated and baked on a conductor directly or through another layer.

2. The insulated wire according to claim 1, wherein said alkoxy- or aryloxy-silane partial condensate containing a glycidyl ether group is obtainable by a dealcoholization reaction of a glycidol with an alkoxy- or aryloxy-silane partial condensate.

3. The insulated wire according to claim 1 or 2, wherein the silane-modified polyamideimide resin has a silicon content of 1 to 15 mass %.

4. The insulated wire according to any one of claim 1 or 2, wherein the silane-modified polyamideimide resin is being baked at a baking temperature of 400 to 550° C. after coating.

5. The insulated wire according to any one of claim 1 or 2, wherein the silane-modified polyamideimide resin is being coated and baked in process in which coating and baking are repeated a plurality of times, such that a step of baking the resin, after each coating, with a baking time of 15 seconds to 1 minute, is repeated at least 6 times.

6. The insulated wire according to any one of claim 1 or 2, wherein the thickness of the insulating film provided by coating and baking of the silane-modified polyamideimide resin, is 0.001 to 0.040 mm.

7. The insulated wire according to any one of claim 1 or 2, wherein a mixture obtained by adding polyethylene wax to a solution of the silane-modified polyamideimide resin is being coated and baked, as the silane-modified polyamideimide resin, on a conductor directly or through another insulting layer, thereby a film of the silane-modified polyamideimide resin having self-lubricity property is provided.

8. The insulated wire according to any one of claim 1 or 2, wherein at least one layer of a polyamideimide resin layer is being provided by coating, as a lower layer, one layer of the silane-modified polyamideimide resin layer is being provided by coating, as an intermediate layer, on the lower layer; and a polyamideimide resin layer is being provided by coating, as an upper layer, on the intermediate layer.

9. An insulated wire, comprising a silane-modified polyamideimide resin having a silicon content of 1 to 15 mass %, that is coated and baked on a conductor directly or through another insulating layer.

* * * * *